US010044034B2

(12) United States Patent
Hotta et al.

(10) Patent No.: US 10,044,034 B2
(45) Date of Patent: Aug. 7, 2018

(54) NEGATIVE ELECTRODE MATERIAL FOR NONAQUEOUS ELECTROLYTE SECONDARY BATTERY, NEGATIVE ELECTRODE FOR NONAQUEOUS ELECTROLYTE SECONDARY BATTERY, NONAQUEOUS ELECTROLYTE SECONDARY BATTERY AND BATTERY PACK

(71) Applicant: Kabushiki Kaisha Toshiba, Minato-ku (JP)

(72) Inventors: Yasuyuki Hotta, Ota (JP); Takashi Kuboki, Ota (JP); Tomokazu Morita, Funabashi (JP); Sara Yoshio, Taito (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 32 days.

(21) Appl. No.: 14/854,182

(22) Filed: Sep. 15, 2015

(65) Prior Publication Data
US 2016/0087278 A1 Mar. 24, 2016

(30) Foreign Application Priority Data

Sep. 19, 2014 (JP) ................................. 2014-191542

(51) Int. Cl.
*H01M 4/13* (2010.01)
*H01M 4/46* (2006.01)
*H01M 4/62* (2006.01)
*H01M 4/134* (2010.01)
*H01M 4/38* (2006.01)
*H01M 4/36* (2006.01)
*H01M 4/485* (2010.01)

(52) U.S. Cl.
CPC .......... *H01M 4/466* (2013.01); *H01M 4/134* (2013.01); *H01M 4/366* (2013.01); *H01M 4/38* (2013.01); *H01M 4/386* (2013.01); *H01M 4/387* (2013.01); *H01M 4/463* (2013.01); *H01M 4/485* (2013.01); *H01M 4/625* (2013.01)

(58) Field of Classification Search
CPC ...... H01M 4/625; H01M 4/134; H01M 4/386; H01M 4/387; H01M 4/485; H01M 4/466; H01M 4/366; H01M 4/38; H01M 4/463
USPC ........................................................ 429/217
See application file for complete search history.

(56) References Cited

U.S. PATENT DOCUMENTS

| 6,413,672 B1 | 7/2002 | Suzuki et al. |
| 2004/0115535 A1 | 6/2004 | Morita et al. |
| 2006/0035149 A1 | 2/2006 | Nanba et al. |

(Continued)

FOREIGN PATENT DOCUMENTS

| JP | 2001-6682 | 1/2001 |
| JP | 2004-119176 | 4/2004 |

(Continued)

*Primary Examiner* — Gary Harris
(74) *Attorney, Agent, or Firm* — Oblon, McClelland, Maier & Neustadt, L.L.P.

(57) ABSTRACT

A negative electrode material for a nonaqueous electrolyte secondary battery of the embodiment include a granular composite product that includes: an organic resin composition; a metal dispersed in the organic resin composition or a metal and an oxide of the metal dispersed in the organic resin composition; an electroconductive carbonaceous material, wherein an elemental ratio A/B (mass/mass) of carbon (A) and hydrogen (B) is 1 or lower.

9 Claims, 5 Drawing Sheets

(56) References Cited

U.S. PATENT DOCUMENTS

| | | |
|---|---|---|
| 2010/0176337 A1 | 7/2010 | Zhamu et al. |
| 2011/0177393 A1 | 7/2011 | Park et al. |
| 2012/0282524 A1* | 11/2012 | Kono .................... H01M 4/525 |
| | | 429/223 |
| 2013/0078490 A1 | 3/2013 | Morita et al. |

FOREIGN PATENT DOCUMENTS

| | | |
|---|---|---|
| JP | 2004-178922 | 6/2004 |
| JP | 2011-96491 | 5/2011 |
| JP | 2012-169259 A | 9/2012 |
| JP | 2012-209229 | 10/2012 |
| JP | 2012-209230 | 10/2012 |
| JP | 2013-73764 | 4/2013 |
| JP | 2013-517615 | 5/2013 |
| JP | 2013-222534 A | 10/2013 |
| JP | 2016-48628 A | 4/2016 |

\* cited by examiner

NEGATIVE ELECTRODE MATERIAL FOR NONAQUEOUS ELECTROLYTE SECONDARY BATTERY, NEGATIVE ELECTRODE FOR NONAQUEOUS ELECTROLYTE SECONDARY BATTERY, NONAQUEOUS ELECTROLYTE SECONDARY BATTERY AND BATTERY PACK

CROSS-REFERENCE TO RELATED APPLICATION

This application is based upon and claims the benefit of priority from Japanese Patent Application No. 2014-191542, filed Sep. 19, 2014, the entire contents of which are incorporated herein by reference.

FIELD

Embodiments described herein relate generally to a negative electrode material for a nonaqueous electrolyte secondary battery, a negative electrode material for a nonaqueous electrolyte secondary battery, a nonaqueous electrolyte secondary battery and a battery pack.

BACKGROUND

In recent years, the miniaturization technology for electronic devices has been rapidly developed, and various kinds of portable electronic devices are becoming popular. Also, a battery, which is a power supply for these portable electronic devices, has been required to be miniaturized, and a nonaqueous electrolyte secondary battery having high energy density is attracting attention.

The nonaqueous electrolyte secondary battery obtained by using metallic lithium as a negative electrode active material is characterized in that the battery life is short because a dendritic crystal called dendrite precipitates on a negative electrode during charge although energy density is very high. Also, in this nonaqueous electrolyte secondary battery, dendrite can be grown so as to reach a positive electrode, thereby causing an internal short circuit, and there are problems in safety. Therefore, a carbon material capable of absorbing and desorbing lithium, specifically graphitic carbon, has been used as a negative electrode active material substituted for metallic lithium.

In order to increase the energy density of a nonaqueous electrolyte secondary battery, it has been attempted to use materials having large lithium absorption capacity and high density for a negative electrode active material. Examples of such materials include an amorphous chalcogen compound and elements such as silicon and tin which form an alloy with lithium. Among these materials, silicon can absorb lithium until the atomic ratio Li/Si of lithium atoms to silicon atoms reaches 4.4. Thus, the negative electrode capacity per mass of silicon is about 10 times as large as that of graphitic carbon.

However, the volume of silicon is greatly changed with the insertion and elimination of lithium during a charge and discharge cycle. This volume change of silicon results in the pulverization of a negative electrode active material particle, which causes the problem that the cycle life of the nonaqueous electrolyte secondary battery is deteriorated.

DETAILED DESCRIPTION

Figure 1:
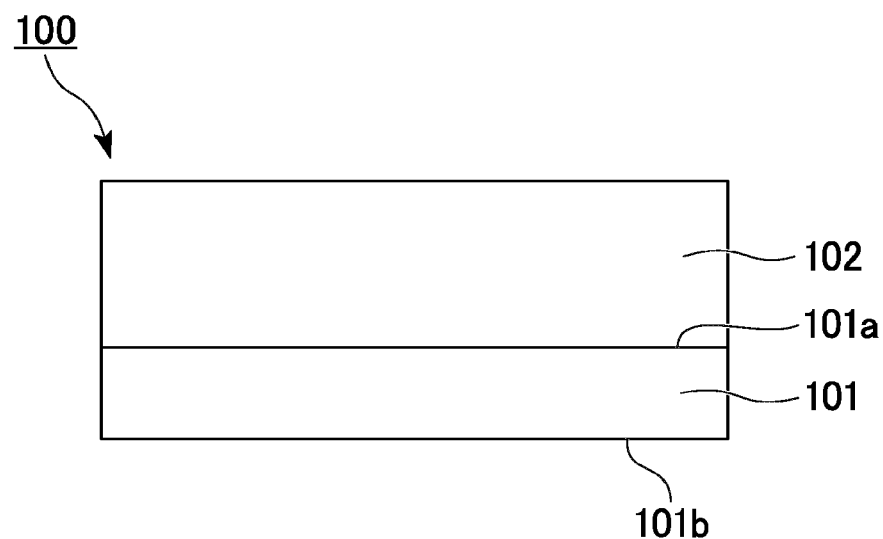
FIG. 1 is a schematic view illustrating the negative electrode according to the second embodiment.

Hereinafter, the embodiments of a negative electrode material for a nonaqueous electrolyte secondary battery, a negative electrode material for a nonaqueous electrolyte secondary battery, a nonaqueous electrolyte secondary battery and a battery pack are described with reference to the drawings.

First Embodiment

The first embodiment provides the negative electrode material for a nonaqueous electrolyte secondary battery include a granular composite product that includes: an organic resin composition; a metal dispersed in the organic resin composition or a metal and an oxide of the metal dispersed in the organic resin composition; an electroconductive carbonaceous material.

The negative electrode material for a nonaqueous electrolyte secondary battery according to the present embodiment is used as the material for forming a negative electrode for a nonaqueous electrolyte secondary battery.

The negative electrode material for a nonaqueous electrolyte secondary battery according to the present embodiment includes a metal or an oxide thereof which carries out the insertion and elimination of lithium. An example of the negative electrode material for a nonaqueous electrolyte secondary battery according to the present embodiment is the material including the electroconductive carbonaceous material and the composite product particle formed of the organic resin composition containing the metal. Also, another example of the negative electrode material for a nonaqueous electrolyte secondary battery according to the present embodiment is the material including the electroconductive carbonaceous material and the composite product particle formed of the organic resin composition having a metal oxide phase and a metal phase. The metal phase is formed of a metal that is dispersed in the metal oxide phase and is complexed with the metal oxide phase.

In the negative electrode material for a nonaqueous electrolyte secondary battery according to the present embodiment (hereinafter may be abbreviated as "negative electrode material"), an elemental ratio A/B (mass/mass) of carbon (A) and hydrogen (B) contained in the various constituent materials is 1 or lower.

When the elemental ratio A/B exceeds 1, the brittleness of the organic resin composition increases, and consequently, a problem occurs in a charge and discharge cycle of the nonaqueous electrolyte secondary battery including the negative electrode formed by using the negative electrode material for a nonaqueous electrolyte secondary battery according to the present embodiment.

The quantification of the carbon contained in the negative electrode material is carried out by elemental analysis using a high-frequency heating/infrared absorption method. Also, the quantification of the hydrogen contained in the negative electrode material is carried out by elemental analysis using an inert gas fusion/thermal conductivity method.

In the negative electrode material for a nonaqueous electrolyte secondary battery according to the present embodiment, it is preferable that the metals and the oxides thereof, which carry out the insertion and elimination of lithium, preferably include at least one selected from the group consisting of Si, Sn, Al, In, Ga, Pb, Ti, Ni, Mg, W, Mo and Fe, and it is more preferably that the metals and the oxides thereof are at least one selected from the group consisting of Si, Sn, Al, In, Ga, Pb, Ti, Ni, Mg, W, Mo and Fe. Of these metals, Si is more preferable because lithium absorption capacity is large.

Hereinafter, the case where the metal is silicon (Si) is described.

The negative electrode material according to the present embodiment is for example the active material containing crystalline silicon which carries out the insertion and elimination of lithium. Specific examples of the negative electrode material include the material formed of the granular composite product including the electroconductive carbonaceous material and the composite product particle (α) formed of the organic resin composition containing the microcrystalline silicon. Also, specific examples of the negative electrode material include the material formed of the granular composite product (γ) including the electroconductive carbonaceous material and the composite product particle (β) formed of the organic resin composition having a silicon oxide phase and a silicon phase. The silicon phase is formed of a crystalline silicon that is dispersed in the silicon oxide phase and is complexed with the silicon oxide phase.

In the composite product particle, the silicon oxide phases are present in a dispersed state within the organic resin composition, and are complexed with the organic resin composition. In other words, the silicon oxide phases (particles) are evenly distributed in the island-shape in the sea of the organic resin composition. In still other words, the silicon oxide phase (particle) is the particle in which the ultra-fine silicon particles are present within the silicon oxide and are precipitated on the surface.

Also, in the composite product particle, the silicon phases are dispersed within the silicon oxide phase, and are complexed with the silicon oxide phase. In other words, the silicon phases (particles) are evenly distributed in the island-shape as the crystalline particles having a particle size of the several nanometers in the sea of the silicon oxide phase. In still other words, the silicon phases (particles) are present within the silicon oxide and are precipitated on the surface.

When the silicon oxide phase and the silicon phase are present as the composite particles (β), the ratio ($Si/SiO_2$) of the silicon phase to the silicon oxide phase is preferably within a range of $0.3 < Si/SiO_2 < 1.5$.

The negative electrode material is for example the particle in which the average primary particle size is within a range of 0.5 μm or more and 100 μm or less and the specific surface area is within a range of 0.5 $m^2$/g or more and 10 $m^2$/g. The particle size and specific surface area of the negative electrode material affect the rate of insertion and elimination reaction of lithium, and have the significant effect on the negative electrode characteristics. When the particle size and specific surface area are within the aforementioned ranges, the negative electrode material can stably exert the negative electrode characteristics.

In the silicon phase of the negative electrode material, the expansion and contraction are large during the absorption and release of lithium. In order to reduce the stress caused by the expansion and contraction, it is preferable that the Si phase be miniaturized as much as possible and be dispersed in the organic resin composition. Specifically, it is preferable that the silicon phase forms an aggregate of silicon having a particle size of several nanometers or more and 200 nm or less and be dispersed in the organic resin composition.

The silicon oxide phase of the composite product particle (β) can form amorphia or crystal, and it is preferable that the silicon oxide phase be bonded to the silicon phase (microcrystalline silicon) and be uniformly dispersed in the negative electrode material in the state of including or holding the silicon phase.

However, when repeating the volume change by absorbing and releasing lithium during charge and discharge, the silicon phases (microcrystalline silicon) held in the silicon oxide phase are bonded to each other, and the crystallite size is grown, which causes the reduction in the capacity and initial charge and discharge efficiency. Therefore, in the present embodiment, the size of the silicon oxide phase is adjusted to be small and uniform, to thereby inhibit the growth of the crystallite size of the silicon phase (microcrystalline silicon), suppress the capacity deterioration due to charge and discharge cycles, and improve the service life.

The average size of the silicon oxide phase is preferably within a range of 50 nm or more and 1000 nm or less, and more preferably within a range of 100 nm or more and less than 500 μm. When the average size of the silicon oxide phase is within the aforementioned range, it is possible to obtain the good service life characteristics.

Also, when the average size of the silicon oxide phase is less than the aforementioned range, it becomes difficult to disperse the silicon oxide phase in the organic resin composition during the production of the negative electrode material. In addition, the electroconductivity of the negative electrode material is reduced, and eventually, the problems such as the reduction in the rate characteristics, the initial charge and discharge capacity and the initial charge and discharge efficiency occur. Meanwhile, when the average size of the silicon oxide phase is more than the aforementioned range, it is not possible to obtain the effect of suppressing the growth of the crystallite size of the microcrystalline silicon.

Also, in order to obtain the good properties as the whole negative electrode material, the average size of the silicon oxide phase is preferably uniform. In more details, the value of (standard deviation/average size) is preferably 1.0 or less and more preferably 0.5 or less when 16% cumulative diameter in volume fraction is represented by d16%, 84% cumulative diameter is represented by d84%, and the value represented by (d84%-d16%)/2 is defined as the standard deviation. When the value of (standard deviation/average size) is within the aforementioned range, it is possible to obtain the good service life characteristics.

Regarding the percentages of the silicon phase, the silicon oxide phase and the organic resin composition phase in the negative electrode material, the silicon/carbon, which is the molar ratio of the sum of the silicon contained in the silicon phase and the silicon oxide phase to the carbon contained in the organic resin composition, is preferably within a range of 0.2 or more and 2 or less, and more preferably within a range of 0.6 or more and 1.5 or less.

When the silicon/carbon is within the aforementioned range, the negative electrode material can have the large capacity and the good cycle characteristics.

The half-value width of the diffraction peak of the Si (220) plane in the powder X-ray diffraction measurement of the negative electrode material is preferably 1.5° or more and 8.0° or less. The half-width of the diffraction peak of Si (220) plane decreases as the crystal grain of the silicon phase grows. Also, when the crystal grain of the silicon phase grows largely, the problem such as crack is likely to occur in the negative electrode material by the expansion and contraction accompanied with the insertion and elimination of lithium. Therefore, when the half-width of the diffraction peak of Si (220) plane is within the range of 1.5° or more and 8.0° or less, it is possible to prevent the aforementioned problem from occurring.

The silicon phase expands or contracts with the insertion and elimination of lithium. With this expansion and contraction, the silicon phases are bonded to one another. The silicon phase is characterized in that the cycle characteristics tend to deteriorate when the size of the silicon phase becomes coarse. In order to prevent the deterioration of the cycle characteristics, cubic zirconia may be added into the negative electrode material in addition to the above materials.

The silicon oxide phase reduces the expansion and contraction of the silicon phase. Examples of the material forming the silicon oxide phase include the compound which is represented by the chemical formula: $SiO_x$ ($1<x\leq2$) and has the structure such as an amorphia, a low-crystal or a crystal.

Also, the lithium silicate such as $Li_4SiO_4$ can be dispersed on the surface or inside of the silicon oxide phase.

The $SiO_2$ precursor and the lithium compound can be added in the organic resin composition phase which coats the silicon phase and the silicon oxide phase. By adding these materials in the organic resin composition phase, the bond between the $SiO_2$ produced from silicon oxide and the carbonaceous material becomes strong, and $Li_4SiO_4$ having the excellent lithium ion conductivity is produced in the silicon oxide phase.

Examples of the $SiO_2$ precursor include alkoxides such as silicon ethoxide.

Examples of the lithium compound include lithium carbonate, lithium oxide, lithium hydroxide, lithium oxalate, and lithium chloride.

Examples of the organic material constituting the organic resin composition include a furan resin, a xylene resin, a ketone resin, an amino resin, a melamine resin, a urea resin, an aniline resin, a urethane resin, a polyimide resin, a polyester resin, an epoxy resin and a phenolic resin. Of these, a phenolic resin is preferable, and a cured product of a resol resin is more preferable. The reason why it is preferable to use a cured product of a resol resin is as follows. In the production of a resole resin, the curing reaction proceeds by dehydration condensation. Therefore, a resol resin moderately becomes porous when the reaction proceeds in an open system. For this reason, it becomes easy to ensure the ionic conductivity in the negative electrode for a nonaqueous electrolyte secondary battery produced by using the negative electrode material according to the present embodiment.

The naphthalene-based material can be added in the organic resin composition. Examples of the naphthalene-based material include 1-naphthol, 2-naphthol, 3-methyl-1-naphthol, 3-methylnaphthalene-2-ol, 3-methoxy-2-naphthol, 1-amino-4-naphthol, 2-amino-1-naphthol, 5-amino-1-naphthol, 6-amino-1-naphthol, 1-(dimethylaminomethyl)-2-naphthol, 5-amino-2-naphthol, 7-amino-naphthalene-2-ol, 8-methylnaphthalene-1-ol, 4-bromo-1-naphthol, 3-bromo-2-naphthol, 2,4-dibromo-1-naphthol, 1,6-dibromo-2-naphthol, 4-chloro-1-naphthol, 2,4-dichloro-1-naphthol, 1-chloronaphthalene-2-ol, 6-amino-1-naphthol, 2-methylnaphthalen-1-ol, 4-methyl-1-naphthol, 5,6,7,8-tetrahydro-1-naphthol, 1,2,3,4-tetrahydro-1-naphthol, 5,8-dihydro-1-naphthol, 4-methoxy-1-naphthol, 6-methoxy-1-naphthol, 1-naphthyl acetic acid, 1'-hydroxy-2'-acetonaphthone, 1-naphthaldehyde, 4-(dimethylamino)-1-naphthaldehyde, 2-naphthaldehyde, 1-naphthalene acetonitrile, 1,3-naphthalene diol, 1,5-naphthalene diol, 2,7-naphthalene diol, 1,4-naphthalene dimethanol, 2,3-naphthalene dimethanol, 1-naphthalene methanol, 2-naphthalene methanol, 1-naphthoic acid, 2-naphthoic acid, 1,4-naphthalene dicarboxylic acid, 2,3-naphthalene dicarboxylic acid, 2,6-naphthalene dicarboxylic acid, and the derivatives thereof and metal salts thereof. When these naphthalene-based materials are mixed with the organic resin composition, it is possible to use the compound produced by preliminarily reacting the naphthalene-based material with formaldehyde or hexamine.

The electroconductive carbonaceous material is used to impart the electroconductivity to the negative electrode material.

Examples of the electroconductive carbonaceous material include at least one selected from the group consisting of graphite, hard carbon, soft carbon, amorphous carbon and acetylene black. As the electroconductive carbonaceous material, the aforementioned material can be used alone or in combination of two or more.

The electroconductive carbonaceous material is not particularly limited, but the fibrous carbon having an aspect ratio of 10 or more is particularly preferable. As the fibrous carbon, it is possible to use a carbon material such as carbon nanotube (CNT) having a fibrous shape.

It is effective that the diameter of the carbon fibers be the almost same as the size of the silicon oxide phase. The average diameter of the carbon fibers is preferably 5 nm or more and 1,000 μm or less, and more preferably 7 nm or more and 100 nm or less.

In the negative electrode material according to the present embodiment, the content of the carbon fibers is preferably within a range of 0.001 mass % to 10 mass % with respect to 100 mass % of the organic resin composition, and more preferably 0.1 mass % or more and 8 mass % or less.

When the content of the conductive carbonaceous material is less than 0.001 mass %, it is not possible to obtain the effect for imparting conductivity to the negative electrode material. On the other hand, when the content of the electroconductive carbonaceous material exceeds 10 mass %, the entire surface of the composite product particle is coated with the electroconductive carbonaceous material, and therefore, the metal or the oxide thereof which carries out the insertion and elimination of lithium is not exposed on the surface of the composite product particle.

Next, the production method of the negative electrode material for a nonaqueous electrolyte secondary battery according to the present embodiment is described.

The negative electrode material according to the present embodiment can be synthesized by mixing and complexing raw materials in a solid phase or liquid phase through a mechanical treatment or stirring treatment, etc. and then subjecting the composite product to a burning treatment.

First, the method of complexing raw materials of the negative electrode material through the mixing and stirring treatment in a solid phase is described.

In the mixing and stirring treatment in a solid phase, silicon or a silicon/silicon oxide raw material; and the organic material made of graphite and a carbon precursor are mixed so as to form a composite product. Hereinafter, silicon or a silicon/silicon oxide raw material may be referred to as a silicon-based particle.

When silicon or a silicon/silicon oxide raw material is used, it is preferable to use $SiO_x$ ($0.8 \leq x \leq 1.5$) as the raw material thereof. Of these raw materials, it is particularly preferable to use $SiO_x$ ($x \approx 1$) because it is possible to adjust the stoichiometric relationship between the silicon phase and the silicon oxide phase to the preferable ratio.

Also, $SiO_x$ can be pulverized during the mixing with the other raw materials, but it is preferable to use fine powder, which has been previously pulverized so as to have a predetermined particle size, in order to shorten the treatment time and to form the silicon oxide phase having a uniform size.

$SiO_x$ can be subjected to the treatment using a continuous ball mill or a planetary ball mill so as to become a fine powder having a predetermined particle size.

The average primary particle size of the $SiO_x$ is preferably 50 nm or more and 1000 nm or less and more preferably 100 nm or more and 500 nm or less.

As $SiO_x$, it is preferable to use the fine powder having a particle size whose variation is small.

Herein, $SiO_x$ is separated into two phases of the silicon phase and the silicon oxide phase through the disproportionation reaction which produces a silicon crystal. In the case of $x=1$ in $SiO_x$, the reaction, which separates $SiO_x$ into two phases of the silicon phase and the silicon oxide phase, is represented by the following formula (1).

$$2SiO \rightarrow Si + SiO_2 \qquad (1)$$

The disproportionation reaction proceeds at a high temperature of 800° C. or higher, and $SiO_x$ is separated into the small silicon phase and the silicon oxide phase. However, as the reaction temperature increases, the silicon crystal phase is enlarged, and the half-value width of the peak of Si (220) is reduced. The burning temperature at which the half-value width of the peak of Si (220) is within a preferable range is 850° C. or higher and 1600° C. or lower. Also, the burning time is preferably within a range of 1 hour to about 12 hours.

On the other hand, when silicon is used, the average primary particle size of silicon is preferably 10 nm or more and 1000 nm or less, and more preferably 20 nm or more and less than 200 nm.

As silicon, it is preferable to use the particle having a particle size whose variation is small.

Usable examples of the organic material include at least one selected from the group consisting of carbon materials such as graphite, coke, low-temperature burned carbon, pitch and carbon nanofiber (CNF), and carbon material precursors thereof. Of these, the organic material, which can be melted by heating, such as pitch is melted during the mechanical milling treatment, and the complexing does not proceed well. Therefore, the organic material, which is melted by heating, is mixed preferably with the organic material, which is not melted during the mechanical milling treatment, such as graphite or coke. Of these organic materials, fibrous carbon such as carbon nanotube (CNT) having a fibrous shape is preferably used.

In the complexing treatment for the raw materials of the negative electrode material, examples of the mechanical complexing treatment in a solid phase include the method using a device such as a turbo mill, a ball mill, a mechanofusion or a disk mill.

The operation conditions for the mechanical complexing treatment vary according to the respective devices, and it is preferable to carry out the mechanical complexing treatment until the raw materials are sufficiently pulverized and the complexing proceeds sufficiently. However, when increasing the power too much and spending the time too much during the complexing, the silicon and the carbon are reacted to thereby produce the silicon carbide that is unreactive for the insertion reaction of lithium. Therefore, it is necessary to adjust the conditions for the complexing treatment to such an extent that the pulverization and complexing of the raw materials proceed sufficiently and the production of the silicon carbide does not occur.

Next, the method of complexing raw materials of the negative electrode material through the mixing and stirring treatment in a liquid phase is described.

The mixing and stirring treatment can be carried out by using various types of stirring device, a ball mill, a bead mill and the combinations thereof.

In the mixing and stirring treatment in a liquid phase, the complexing of the silicon-based particle of a fine particle with the organic materials in a liquid is preferably carried out by mixing those in a liquid obtained by using a dispersion medium because it is difficult to uniformly disperse the silicon-based particle and the organic materials without aggregating those by using a dry-type mixing device.

As the dispersion medium, an organic solvent or water, etc. can be used, and it is preferable to use a dispersing medium having a good affinity for the silicon-based particle of a fine particle, the organic materials and the electroconductive carbonaceous material. Specific examples of the dispersion medium include ethanol, acetone, isopropyl alcohol, methyl ethyl ketone, ethyl acetate and toluene.

Also, in order to be uniformly mixed with the silicon-based particle of the fine particle, the organic material is preferably soluble in the liquid or dispersion medium in the mixing stage, and particularly preferably a liquid and a readily polymerizable monomer or oligomer. Examples of the organic material include a furan resin, a xylene resin, a ketone resin, an amino resin, a melamine resin, a urea resin, an aniline resin, a urethane resin, a polyimide resin, a polyester resin, an epoxy resin and a phenolic resin.

Also, the aforementioned naphthalene-based material can be added in these organic materials. When the naphthalene-based material is mixed with the organic material, it is possible to use the compound produced by preliminarily reacting the naphthalene-based material with formaldehyde or hexamine.

The negative electrode material according to the present embodiment, which is formed of the $SiO_x$/organic material composite product or the Si/organic material composite product, can be obtained by subjecting the material subjected to the complexing treatment in the aforementioned manner to the granulation process using spray dryer, etc. so as to mold the material in a granular shape, and then subjecting the granulated product to the solidification step and the curing step.

According to the negative electrode material for a nonaqueous electrolyte secondary battery according to the present embodiment, the elemental ratio A/B (mass/mass) of carbon (A) and hydrogen (B) contained in the s constituent materials of the negative electrode material is set to 1 or lower, and therefore, the brittleness of the organic resin composition which constitutes the negative electrode material decreases. As a result, the charge and discharge cycle of the nonaqueous electrolyte secondary battery, which has the negative electrode formed by using the negative electrode material for a nonaqueous electrolyte secondary battery according to the present embodiment, is improved.

Second Embodiment

The second embodiment provides the negative electrode including a current collector; and the negative electrode mixture layer that is formed on the current collector and contains the aforementioned negative electrode material for a nonaqueous electrolyte secondary battery according to the first embodiment, an electroconductive agent and a binder.

In other words, the negative electrode according to the present embodiment includes the current collector; and the negative electrode mixture layer that is formed on the current collector and contains the aforementioned negative electrode material for a nonaqueous electrolyte secondary battery according to the first embodiment, the electroconductive agent and the binder.

The negative electrode according to the present embodiment is described as an electrode used for a nonaqueous electrolyte secondary battery, but the negative electrode according to the present embodiment can be used for various batteries.

Hereinafter, the negative electrode according to the present embodiment is described in detail with reference to FIG. 1.

FIG. 1 is a schematic view illustrating the negative electrode according to the present embodiment.

The negative electrode 100 according to the present embodiment includes the negative electrode current collector 101; and the negative electrode mixture layer 102 as shown in FIG. 1.

The negative electrode mixture layer 102 is the layer which is provided on the one surface 101a of the negative electrode current collector 101 and is formed of the mixture containing the aforementioned negative electrode material for a nonaqueous electrolyte secondary battery according to the first embodiment, the electroconductive agent and the binder. The hinder hinds the negative electrode current collector 101 and the negative electrode mixture layer 102.

The thickness of the negative electrode mixture layer 102 is preferably within a range of 1.0 µm or more and 150 µm or less, and more preferably within a range of 10 µm or more and 100 µm or less. Therefore, when the negative electrode mixture layers 102 are provided on the both surfaces (the one surface 101a and the other surface 101b) of the negative electrode current collector 101, the total thickness of the negative electrode mixture layers 102 is within a range of 2.0 µm or more and 300 µm or less. When the thickness of the negative electrode mixture layer 102 is within the aforementioned range, the large current discharge characteristics and cycle characteristics of the nonaqueous electrolyte secondary battery including the negative electrode 100 are improved significantly.

Regarding the blending ratio of the negative electrode material, the electroconductive agent and the binder in the negative electrode mixture layer 102, the negative electrode material is preferably blended within a range of 57 mass % or more and 95 mass % or less, the electroconductive agent is preferably blended within a range of 3 mass % or more and 20 mass % or less, and the binder is preferably blended within a range of 2 mass % or more and 40 mass % or less. When the blending ratio of the negative electrode material, the electroconductive agent and the binder is within the aforementioned range, it is possible to obtain the good large current discharge characteristics and cycle characteristics in the nonaqueous electrolyte secondary battery including the negative electrode 100.

The negative electrode current collector 101 is the electroconductive member to be bound with the negative electrode mixture layer 102. As the negative electrode current collector 101, it is possible to use an electroconductive substrate having a porous structure or a non-porous electroconductive substrate. These electroconductive substrates can be formed of an electroconductive material such as copper, nickel, alloys thereof or stainless steel. Of these electroconductive materials, copper and a copper alloy are the most preferable in terms of electroconductivity.

The thickness of the negative electrode current collector 101 is preferably within a range of 5 µm to 20 µm. When the thickness of the negative electrode current collector 101 is within the range, it is possible to achieve the balance between electrode strength and reduction in weight.

The electroconductive agent has the effect of improving the electroconductivity of the negative electrode 100, and it is preferable that the electroconductive agent be dispersed in the negative electrode mixture layer 102. Examples of the electroconductive agent include acetylene black, carbon black and graphite.

As the electroconductive agent, it is possible to use a scaly shaped, crushed shaped or fibrous shaped electroconductive agent.

These electroconductive agents can be used alone or in combination of two or more.

The binder fills the gaps among the dispersed negative electrode materials, binds the negative electrode material and the electroconductive agent, and binds the negative electrode material and the negative electrode current collector 101.

Examples of the binder include polytetrafluoroethylene (PTFE), polyvinylidene fluoride (PVdF), polyacrylic acid, polysaccharides such as alginic acid and cellulose and the derivatives thereof, an ethylene-propylene-diene copolymer (EPDM), styrene-butadiene rubber (SBR), polyimide, polyamide, and polyamide-imide. Of these, the polymers such as polyimides having an imide structure are more preferable because the binding force for the negative electrode current collector 101 is high and the binding force between the negative electrode materials is enhanced.

The binder can be used alone or in combination of two or more. When the binder is used in combination of two or more, the life property of the negative electrode 100 can be improved by employing the combination of the binder having excellent binding property for the negative electrode materials and the binder having excellent binding property for the negative electrode material and the negative electrode current collector 101, or the combination of the binder having high hardness and the binder having excellent flexibility.

Next, the production method of the negative electrode 100 is described.

Firstly, the negative electrode material, the electroconductive agent and the binder are suspended in a general solvent so as to prepare a slurry.

Subsequently, the slurry is applied onto the one surface 101a of the negative electrode current collector 101 followed by drying to form the negative electrode mixture layer 102. Then, the negative electrode mixture layer 102 is subjected to pressing, to thereby obtain the negative electrode 100.

Herein, the embedding degree of the negative electrode material into the negative electrode current collector 101 can be adjusted by adjusting the pressing pressure. It is not preferable that the pressing pressure be less than 0.2 kN because the embedding of the negative electrode material into the negative electrode current collector 101 hardly occurs. On the other hand, it is not preferable that the pressing pressure exceeds 10 kN because the breakage such as the crack of the negative electrode material and the negative electrode current collector 101 occurs. Therefore, the pressing pressure for the negative electrode mixture layer 102 formed by drying the slurry is preferably within a range of 0.5 kN or higher and 5 kN or lower.

The negative electrode for a nonaqueous electrolyte secondary battery according to the present embodiment is formed by using the negative electrode material for a nonaqueous electrolyte secondary battery according to the aforementioned first embodiment, and therefore, the charge and discharge cycle of the nonaqueous electrolyte secondary battery having the negative electrode is improved.

Third Embodiment

The third embodiment provides the nonaqueous electrolyte secondary battery comprising the negative electrode for a nonaqueous electrolyte secondary battery according to the aforementioned second embodiment, a positive electrode, a nonaqueous electrolyte, a separator and an exterior material.

More specifically, the nonaqueous electrolyte secondary battery according to the present embodiment includes an exterior material, a positive electrode that is housed in the exterior material, the negative electrode that is spatially separated from the positive electrode and is housed in the exterior material with a separator interposed therebetween, and a nonaqueous electrolyte charged in the exterior material.

Hereinafter, the negative electrode, the positive electrode, the nonaqueous electrolyte, the separator and the exterior material, which are constituent members of the nonaqueous electrolyte secondary battery according to the present embodiment, are described in detail.

(1) Negative Electrode

As the negative electrode, the aforementioned negative electrode according to the second embodiment is used.

(2) Positive Electrode

The positive electrode includes the positive electrode current collector and the positive electrode mixture layer that is formed on one surface or both surfaces of the positive electrode current collector and contains a positive electrode active material, an electroconductive agent and a binder. An electroconductive agent and a binder are optional components.

The thickness of the positive electrode mixture layer on one surface is preferably within a range of 1.0 μm or more and 150 μm or less, and more preferably within a range of 30 μm or more and 120 μm or less. Therefore, when the positive electrode mixture layers are provided on the both surfaces of the positive electrode current collector, the total thickness of the positive electrode mixture layers is within a range of 2.0 μm or more and 300 μm or less.

When the thickness of the positive electrode mixture layer is within the aforementioned range, the large current discharge characteristics and cycle characteristics of the nonaqueous electrolyte secondary battery including a positive electrode are improved significantly.

As the positive electrode active material, various oxides can be used. Examples of oxides include manganese dioxide, a lithium-manganese composite oxide, a lithium-containing cobalt oxide (such as $LiCoO_2$), a lithium-containing nickel-cobalt oxide (such as $LiNi_{0.8}Co_{0.2}O_2$) and a lithium-manganese composite oxide (such as $LiMn_2O_4$ or $LiMnO_2$). These positive electrode active materials are preferable because the nonaqueous electrolyte secondary battery can have a high voltage.

The average primary particle size of the positive electrode active material is preferably within a range of 100 nm to 1 μm. When the average primary particle size of the positive electrode active material is 100 nm or more, it is easy to handle in industrial manufacturing. Also, when the average primary particle size of the positive electrode active material is 1 μm or less, it is possible to make the lithium ion diffusion in solid proceed smoothly.

The electroconductive agent improves the current collection performance of the positive electrode active material and suppresses contact resistance between the positive electrode active material and the positive current collector. Examples of the electroconductive agent include agents containing acetylene black, carbon black, artificial graphite, natural graphite, a carbon fiber, and an electroconductive polymer.

The type of the electroconductive agent can be one, or two or more.

The binder fills the gap between the dispersed positive electrode active materials so as to bind the positive electrode active material and the electroconductive agent and to bind the positive electrode active material and the positive electrode current collector.

Examples of the binder include the organic materials such as polytetrafluoroethylene (PTFE), polyvinylidene fluoride (PVdF), and fluorine-based rubber and polyacrylic acid.

The type of the binder can be one, or two or more.

Also, examples of an organic solvent for dispersing the binder include N-methyl-2-pyrrolidone (NMP) and dimethylformamide (DMF).

Regarding the blending ratio of the positive electrode active material, the electroconductive agent and the binder in the positive electrode mixture layer, the positive electrode active material is preferably blended within a range of 80 mass % or more and 95 mass % or less, the electroconductive agent is preferably blended within a range of 3 mass % or more and 20 mass % or less, and the binder is preferably blended within a range of 2 mass % or more and 7 mass % or less. When the blending ratio is within the aforementioned range, it is possible to obtain the good large current discharge characteristics and cycle characteristics in the nonaqueous electrolyte secondary battery including the positive electrode.

The positive electrode current collector is the electroconductive member to be bound with the positive electrode mixture layer. As the positive electrode current collector, an electroconductive substrate having a porous structure or a non-porous electroconductive substrate can be used.

The thickness of the positive electrode current collector is preferably within a range of 8 μm to 15 μm. When the thickness of the positive electrode current collector is within the range, it is possible to achieve the balance between electrode strength and reduction in weight.

Next, the production method of the positive electrode is described.

Firstly, the positive electrode active material, the electroconductive agent and the binder are suspended in a general solvent so as to prepare slurry.

Subsequently, the slurry is applied on the positive electrode current collector followed by drying to form the positive electrode mixture layer. Then, the positive electrode mixture layer is subjected to pressing, to thereby obtain the positive electrode.

Also, the positive electrode can be produced by molding the positive electrode active material, the binder and the electroconductive agent to be blended according to need in a pellet shape to form the positive electrode mixture layer, and disposing this positive electrode mixture layer on the positive electrode current collector.

(3) Nonaqueous Electrolyte

As the nonaqueous electrolyte, a nonaqueous electrolyte solution, an electrolyte-impregnated polymer electrolyte, a polymer electrolyte or an inorganic solid electrolyte are used.

A nonaqueous electrolyte solution is a liquid nonaqueous electrolyte prepared by dissolving an electrolyte in a nonaqueous solvent (an organic solvent), and is held in the gap in the electrode group.

As a nonaqueous solvent, it is preferable to use the solvent which mainly contains the mixed solvent of cyclic carbonates (hereinafter, referred to as the "first solvent") such as ethylene carbonate (EC), propylene carbonate (PC) and vinylene carbonate, and nonaqueous solvents having lower viscosity than the cyclic carbonates (hereinafter, referred to as the "second solvent").

Examples of the second solvent include chain carbonates such as dimethyl carbonate (DMC), diethyl carbonate (DEC) and methylethyl carbonate (MEC); ethyl propionate; methyl propionate; γ-butyrolactone (GBL); acetonitrile (AN); ethyl acetate (EA); toluene; xylene; and methyl acetate (MA). These second solvents can be used alone or in a mixed solvent form of two or more. In particular, it is more preferable that the second solvent have a donor number of 16.5 or less.

It is preferable that the viscosity of the second solvent be 2.8 cPs or less at 25° C. Herein, 1 cPs is converted into 1 mPa·s. The blending percentage of ethylene carbonate or propylene carbonate in the mixed solvent of the first solvent and the second solvent is preferably 1.0 vol % or more and 80 vol % or less, and more preferably 20 vol % or more and 75 vol % or less.

Examples of an electrolyte contained in a nonaqueous electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$) and lithium bistrifluoromethylsulfonimide [$LiN(CF_3SO_2)_2$]. Among these, it is preferable to use lithium hexafluorophosphate or lithium tetrafluoroborate.

It is preferable that the dissolving amount of the electrolyte relative to the nonaqueous solvent contained in nonaqueous electrolyte be 0.5 mol/L or more and 2.0 mol/L or less.

(4) Separator

The separator is placed between the positive electrode and the negative electrode.

The separator is formed of a porous film such as polyethylene (PE), polypropylene (PP), cellulose or polyvinylidene fluoride (PVdF), or a nonwoven fabric made of a synthetic resin, for example. Among these, a porous film formed of polyethylene or polypropylene is preferable because this kind of film can be melt at a certain temperature so as to block a current, which can improve safety.

The thickness of the separator is preferably 5 μm or more and 30 μm or less, and more preferably 10 μm or more and 25 μm or less. When the thickness of the separator is less than 5 μm, the strength of the separator is significantly deteriorated, and there is the possibility that the internal short circuit is likely to occur. Meanwhile, when the thickness of the separator is more than 30 μm, the distance between the positive electrode and the negative electrode is increased, and there is the possibility that the internal resistance is increased.

When the separator is allowed to stand for 1 hour at 120° C., the thermal shrinkage percentage is preferably 20% or less and more preferably 15% or less. When the thermal shrinkage percentage of the separator is more than 20%, there is the increased possibility that heating causes the short circuit between the positive electrode and the negative electrode.

The porosity of the separator is preferably 30% or more and 70% or less and more preferably 35% or more and 70% or less.

The reason why the porosity of the separator is preferably within the aforementioned range is as follows. When the porosity is less than 30%, there is the possibility that the high electrolyte-holding property cannot be obtained in the separator. Meanwhile, when the porosity is higher than 70%, there is the possibility that the sufficient strength cannot be obtained in the separator.

The air permeability of the separator is preferably 30 seconds/100 $cm^3$ or more and 500 seconds/100 $cm^3$ or less and more preferably 50 seconds/100 $cm^3$ or more and 300 seconds/100 $cm^3$ or less.

When the air permeability is less than 30 seconds/100 $cm^3$, there is the possibility that the sufficient strength cannot be obtained in the separator. Meanwhile when the air permeability is higher than 500 seconds/100 $cm^3$, there is the possibility that the high lithium ion mobility cannot be obtained in the separator.

(5) Exterior Material

As the exterior material which houses the positive electrode, the negative electrode and the nonaqueous electrolyte, a metal container or an exterior container made of a laminated film.

As a metal container, the metal can formed of aluminum, an aluminum alloy, iron or stainless steel in a rectangular or cylindrical shape is used. Also, the thickness of the metal container is preferably 1 mm or less, more preferably 0.5 mm or less and much more preferably 0.2 mm or less.

As an aluminum alloy, an alloy containing an element such as magnesium, zinc or silicon is preferred. When a transition metal such as iron, copper, nickel or chromium is contained in the aluminum alloy, the content of the transition metal is preferably 100 ppm or less. Because the metal container made of the aluminum alloy has the much greater strength than the metal container made of aluminum, the thickness of the metal container can be reduced. As a result, it is possible to realize the thin and lightweight nonaqueous electrolyte secondary battery which has high power and excellent heat radiation property.

Examples of a laminated film include a multi-layer film in which an aluminum foil is coated with a resin film. Usable examples of a resin constituting a resin film include a polymer material such as polypropylene (PP), polyethylene (PE), nylon or polyethylene terephthalate (PET). Also, the thickness of the laminated film is preferably 0.5 mm or less and more preferably 0.2 mm or less. The purity of an aluminum foil is preferably 99.5% or more.

Herein, the present embodiment can be applied to the nonaqueous electrolyte battery having various shapes such as a flat type (thin type), a square type, a cylindrical type, a coin type and a button type.

Also, the nonaqueous electrolyte secondary battery according to the present embodiment can further include a lead which is electrically connected to the electrode group containing the positive electrode and the negative electrode. For example, the nonaqueous electrolyte secondary battery according to the present embodiment can include two leads. In this case, one of the leads is electrically connected to the positive electrode current collector tab and the other lead is electrically connected to the negative electrode current collector tab.

The material of the lead is not particularly limited, but for example, the same material for the positive electrode current collector and the negative electrode current collector is used.

The nonaqueous electrolyte secondary battery according to the present embodiment can further include a terminal which is electrically connected to the aforementioned lead and is drawn from the aforementioned exterior material. For example, the nonaqueous electrolyte secondary battery according to the present embodiment can include two terminals. In this case, one of the terminals is connected to the lead which is electrically connected to the positive electrode current collector tab and the other terminal is connected to the lead which is electrically connected to the negative electrode current collector tab.

The material of the terminal is not particularly limited, but for example, the same material for the positive electrode current collector and the negative electrode current collector is used.

(6) Nonaqueous Electrolyte Secondary Battery

Figure 2:
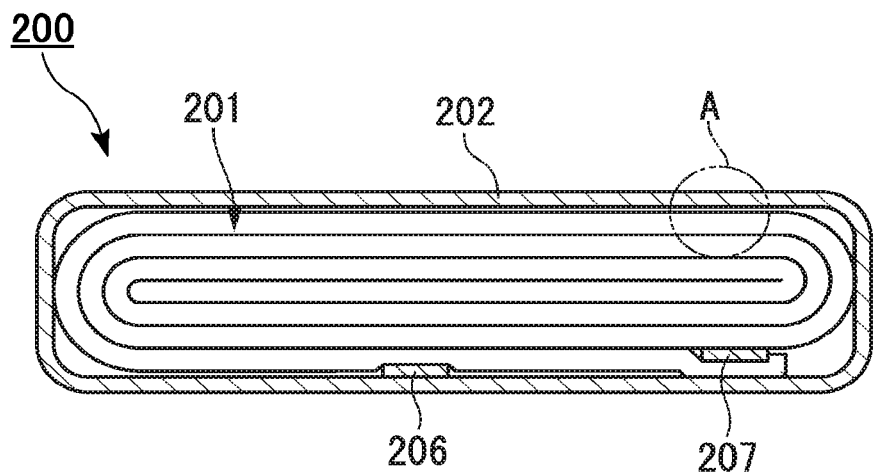
FIG. 2 is a schematic view illustrating the nonaqueous electrolyte secondary battery according to the third embodiment.
Figure 3:
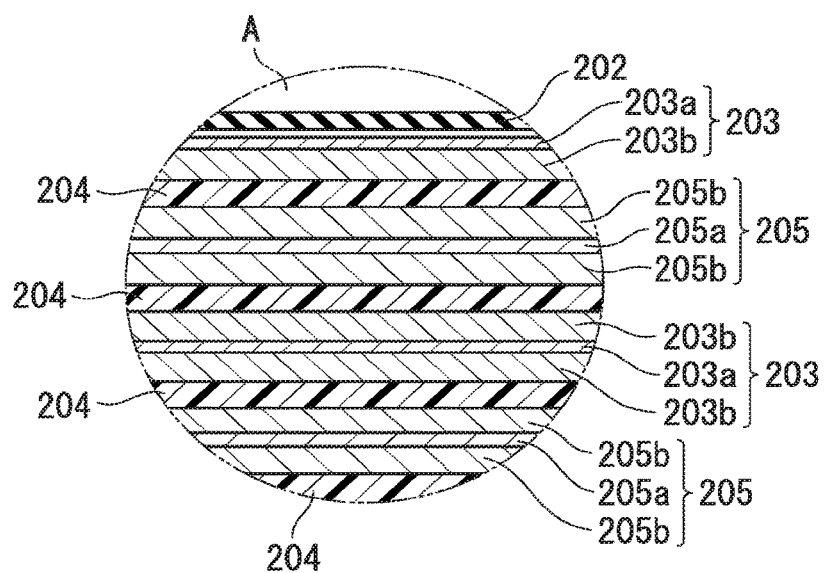
FIG. 3 is a schematic view illustrating the nonaqueous electrolyte secondary battery according to the third embodiment.

Next, the flat type nonaqueous electrolyte secondary battery (nonaqueous electrolyte secondary battery) 200 illustrated in FIG. 2 and FIG. 3 is described as an example of the nonaqueous electrolyte secondary battery according to the present embodiment. FIG. 2 is a schematic sectional view illustrating the cross-section of the flat type nonaqueous electrolyte secondary battery 200. FIG. 3 is an enlarged sectional view illustrating the part A illustrated in FIG. 2. These drawings are schematic diagrams for describing the nonaqueous electrolyte secondary battery according to the embodiment. The shapes, dimensions, ratios, and the like are different from those of actual device at some parts, but design of the shape, dimensions, ratios, and the like can be appropriately modified in consideration of the following description and known technologies.

The flat type nonaqueous electrolyte secondary battery 200 illustrated in FIG. 2 is configured such that the winding electrode group 201 with a flat shape is housed in the exterior material 202. The exterior material 202 may be a container obtained by forming a laminated film in a bag-like shape or may be a metal container. Also, the winding electrode group 201 with the flat shape is formed by spirally winding the laminated product obtained by laminating the negative electrode 203, the separator 204, the positive electrode 205 and the separator 204 from the outside, i.e. the side of the exterior material 202, in this order, followed by performing press-molding. As illustrated in FIG. 3, the negative electrode 203 located at the outermost periphery has the configuration in which the negative electrode layer 203b is formed on one surface of the negative electrode current collector 203a on the inner surface side. The negative electrodes 203 at the parts other than the outermost periphery have the configuration in which the negative electrode layers 203b are formed on both surfaces of the negative current collector 203a. Also, the positive electrode 205 has the configuration in which the positive electrode layers 205b are formed on both surfaces of the positive current collector 205a. Herein, a gel-like nonaqueous electrolyte can be used instead of the separator 204.

In the vicinity of the outer peripheral end of the winding electrode group 201 illustrated in FIG. 2, the negative electrode terminal 206 is electrically connected to the negative current collector 203a of the negative electrode 203 of the outermost periphery. The positive electrode terminal 207 is electrically connected to the positive current collector 205a of the inner positive electrode 205. The negative electrode terminal 206 and the positive electrode terminal 207 extend toward the outer portion of the exterior material 202, and are connected to the extraction electrodes included in the exterior material 202.

When manufacturing the nonaqueous electrolyte secondary battery 200 including the exterior material formed of the laminated film, the winding electrode group 201 to which the negative electrode terminal 206 and the positive electrode terminal 207 are connected is charged in the exterior material 202 having the bag-like shape with an opening, the liquid nonaqueous electrolyte is injected from the opening of the exterior material 202, and the opening of the exterior material 202 with the bag-like shape is subjected to heat-sealing in the state of sandwiching the negative electrode terminal 206 and the positive electrode terminal 207 therebetween. Through this process, the winding electrode group 201 and the liquid nonaqueous electrolyte are completely sealed.

Also, when manufacturing the nonaqueous electrolyte battery 200 having the exterior material formed of the metal container, the winding electrode group 201 to which the negative electrode terminal 206 and the positive electrode terminal 207 are connected is charged in the metal container having an opening, the liquid nonaqueous electrolyte is injected from the opening of the exterior material 202, and the opening is sealed by mounting a cover member on the metal container.

For the negative electrode terminal 206, it is possible to use the material having electric stability and electroconductivity within a range of a potential equal to or nobler than 1 V and equal to or lower than 3 V with respect to lithium, for example. Specific examples of this material include aluminum and an aluminum alloy containing an element such as Mg, Ti, Zn, Mn, Fe, Cu or Si. Also, it is more preferable that the negative electrode terminal 206 be formed of the same material as the negative current collector 203a in order to reduce the contact resistance with the negative current collector 203a.

For the positive electrode terminal 207, it is possible to use the material having electric stability and electroconductivity within a range of a potential equal to or nobler than 3 V and equal to or lower than 4.25 V with respect to lithium. Specific examples of this material include aluminum and an aluminum alloy containing an element such as Mg, Ti, Zn, Mn, Fe, Cu or Si. It is more preferable that the positive electrode terminal 207 be formed of the same material as the positive current collector 205a in order to reduce the contact resistance with the positive current collector 205a.

Hereinafter, the exterior material 202, the negative electrode 203, the positive electrode 205, the separator 204, and the nonaqueous electrolyte which are constituent members of the nonaqueous electrolyte battery 200 is described in detail.

(1) Exterior Material

As the exterior material 202, the aforementioned exterior material is used.

(2) Negative Electrode

As the negative electrode 203, the aforementioned negative electrode is used.

(3) Positive Electrode

As the positive electrode 205, the aforementioned positive electrode is used.

(4) Separator

As the separator 204, the aforementioned separator is used.

(5) Nonaqueous Electrolyte

As the nonaqueous electrolyte, the aforementioned nonaqueous electrolyte is used.

Figure 4:
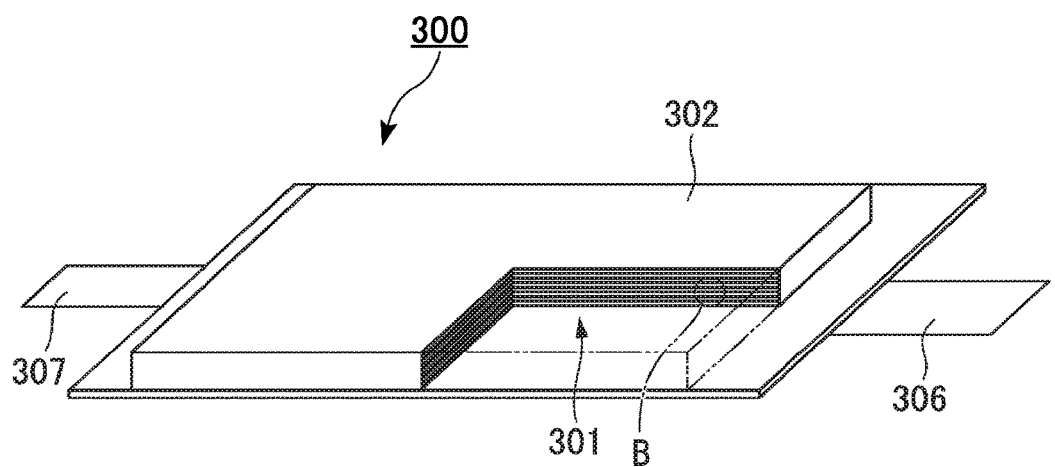
FIG. 4 is a schematic view illustrating the nonaqueous electrolyte secondary battery according to the third embodiment.
Figure 5:
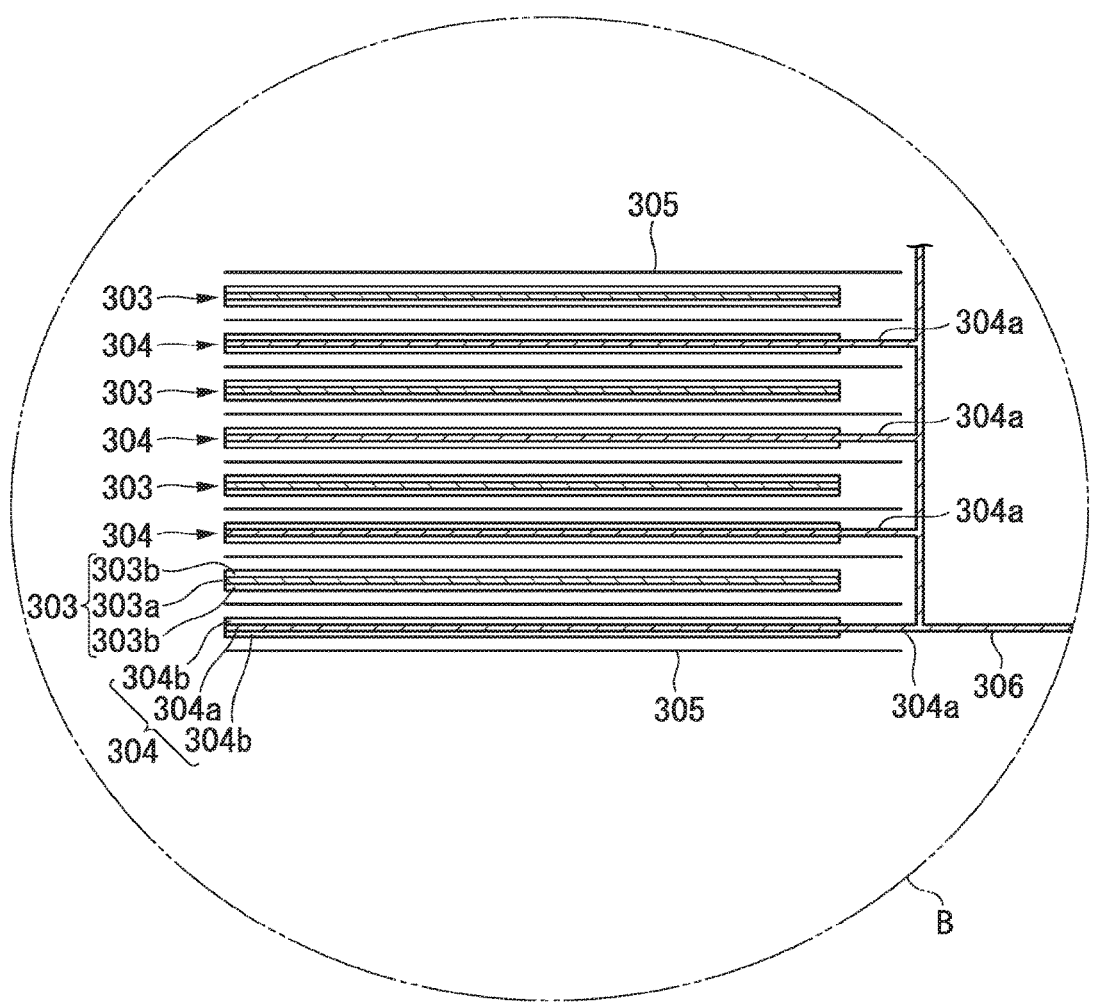
FIG. 5 is a schematic view illustrating the nonaqueous electrolyte secondary battery according to the third embodiment.

The configuration of the nonaqueous electrolyte secondary battery according to the third embodiment is not limited to the aforementioned configuration illustrated in FIG. 2 and FIG. 3. For example, the batteries having the configurations illustrated in FIG. 4 and FIG. 5 can be used. FIG. 4 is a partial cutout perspective view schematically illustrating another flat type nonaqueous electrolyte secondary battery according to the third embodiment. FIG. 5 is an enlarged schematic sectional view illustrating the part B of FIG. 4.

The nonaqueous electrolyte secondary battery 300 illustrated in FIG. 4 and FIG. 5 is configured such that the lamination type electrode group 301 is housed in the exterior member 302. As illustrated in FIG. 5, the lamination type electrode group 301 has the structure in which the positive electrodes 303 and negative electrodes 304 are alternately laminated while interposing separators 305 therebetween.

The plurality of positive electrodes 303 are present and each includes the positive electrode current collector 303a and the positive electrode layers 303b supported on both surfaces of the positive electrode current collector 303a. The positive electrode layer 303b contains the positive electrode active material.

The plurality of negative electrodes 304 are present and each includes the negative electrode current collector 304a and the negative electrode layers 304b supported on both surfaces of the negative electrode current collector 304a. The negative electrode layer 304b contains the negative electrode active material. One side of the negative electrode current collector 304a of each negative electrode 304 protrudes from the negative electrode 304. The protruding negative electrode current collector 304a is electrically connected to a strip-shaped negative electrode terminal 306. The front end of the strip-shaped negative electrode terminal 306 is drawn from the exterior member 302 to the outside. Although not illustrated, in the positive electrode current collector 303a of the positive electrode 303, the side located opposite to the protruding side of the negative electrode current collector 304a protrudes from the positive electrode 303. The positive electrode current collector 303a protruding from the positive electrode 303 is electrically connected to the strip-shaped positive electrode terminal 307. The front end of the strip-shaped positive electrode terminal 307 is located on an opposite side to the negative electrode terminal 306, and is drawn from the side of the exterior member 302 to the outside.

The material, a mixture ratio, dimensions, and the like of each member included in the nonaqueous electrolyte secondary battery 300 illustrated in FIG. 4 and FIG. 5 are configured to be the same as those of each constituent member of the nonaqueous electrolyte secondary battery 200 described in FIG. 2 and FIG. 3.

According to the present embodiment described above, it is possible to provide the nonaqueous electrolyte secondary battery.

The nonaqueous electrolyte secondary battery according to the present embodiment includes the negative electrode, the positive electrode, the nonaqueous electrolyte, the separator and the exterior material. The negative electrode is formed by using the aforementioned negative electrode material for a nonaqueous electrolyte secondary battery according to the first embodiment.

This kind of the nonaqueous electrolyte secondary battery has low brittleness of the organic resin composition constituting the negative electrode material for forming the negative electrode, and thus, the charge and discharge cycle is improved.

Fourth Embodiment

Next, the nonaqueous electrolyte secondary battery pack according to the fourth embodiment is described in detail.

The nonaqueous electrolyte secondary battery pack according to the present embodiment includes at least one nonaqueous electrolyte secondary battery according to the aforementioned third embodiment (i.e. a single battery). When the plurality of single batteries are included in the nonaqueous electrolyte secondary battery pack, the respective single batteries are disposed so as to be electrically connected in series, in parallel, or in series and parallel.

Figure 6:
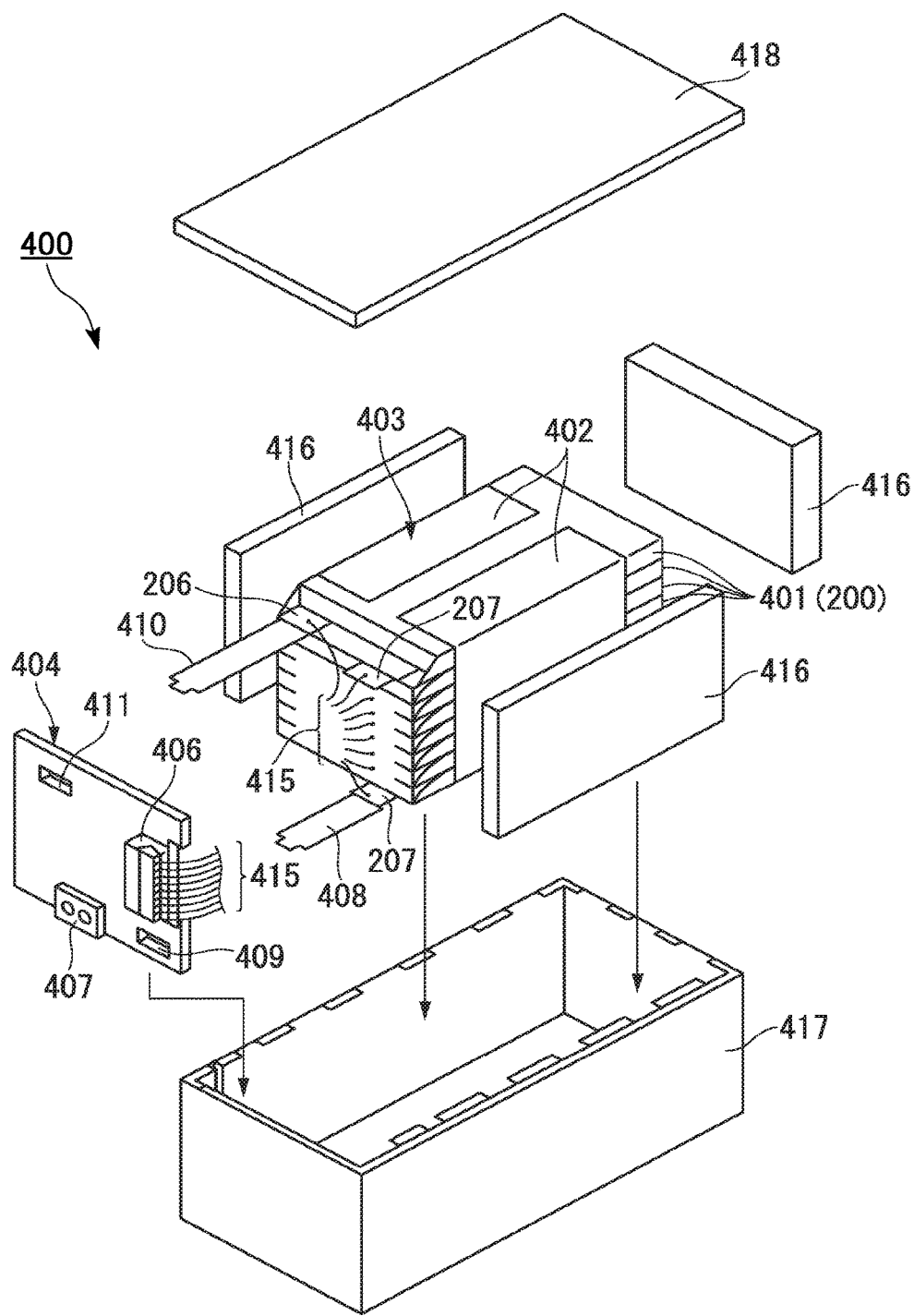
FIG. 6 is a schematic perspective view illustrating the battery pack according to the fourth embodiment.
Figure 7:
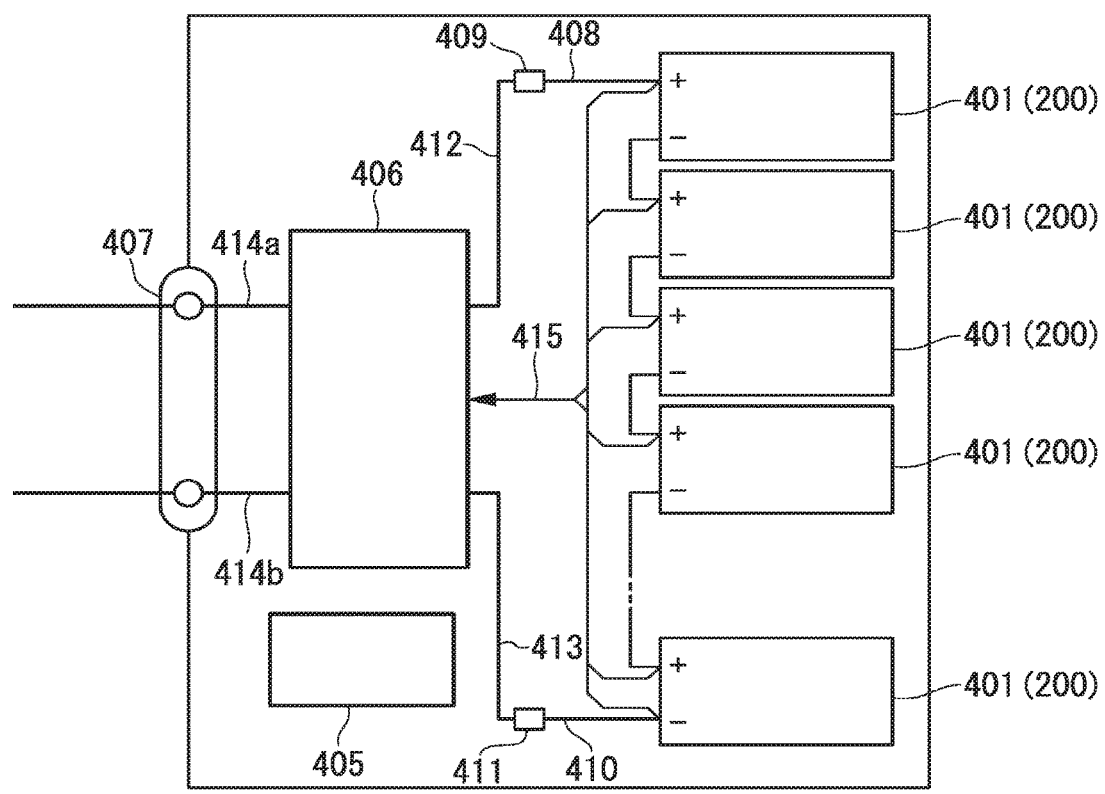
FIG. 7 is a schematic view illustrating the battery pack according to the fourth embodiment.

Referring to FIG. 6 and FIG. 7, the nonaqueous electrolyte secondary battery pack 400 according to the present embodiment is described in detail. In the battery pack 400 illustrated in FIG. 6, the flat type nonaqueous electrolyte battery 200 illustrated in FIG. 2 is used as the single battery 401.

The plurality of single batteries 401 are laminated so that the negative electrode terminals 206 and the positive electrode terminals 207 extending to the outside are arranged in the same direction, and thus the assembled batteries 403 are configured by fastening with the adhesive tape 402. These single batteries 401 are connected mutually and electrically in series, as illustrated in FIG. 6 and FIG. 7.

The printed wiring board 404 is disposed to face the side surfaces of the single batteries 401 in which the negative electrode terminals 206 and the positive electrode terminals 207 extend. As illustrated in FIG. 6, the thermistor 405 (see FIG. 7), the protective circuit 406 and the electrifying terminal 407 to an external device are mounted on the printed wiring board 404. Herein, an insulation plate (not illustrated) is mounted on the surface of the printed wiring board 404 facing the assembled batteries 403 in order to avoid unnecessary connection with wirings of the assembled batteries 403.

The positive electrode-side lead 408 is connected to the positive electrode terminal 207 located in the lowermost layer of the assembled batteries 403, and the front end of the positive electrode-side lead 408 is inserted into the positive electrode-side connector 409 of the printed wiring board 404 to be electrically connected. The negative electrode-side lead 410 is connected to the negative electrode terminal 206 located in the uppermost layer of the assembled batteries 403, and the front end of the negative electrode-side lead 410 is inserted into the negative electrode-side connector 411 of the printed wiring board 404 to be electrically connected. These positive electrode-side connector 409 and negative electrode-side connector 411 are connected to the protective circuit 406 via wirings 412 and 413 (see FIG. 7) formed in the printed wiring board 404.

The thermistor 405 is used to detect a temperature of the single battery 401. Although not illustrated in FIG. 6, the thermistor 405 is installed near the single batteries 401, and a detection signal is transmitted to the protective circuit 406. The protective circuit 406 can block the plus-side wiring 414a and the minus-side wiring 414b between the protective circuit 406 and the electrifying terminal 407 for an external device under a predetermined condition. Here, for example, the predetermined condition means that the detection temperature of the thermistor 405 becomes equal to or greater than a predetermined temperature. In addition, the predetermined condition also means that an overcharge, overdischarge, overcurrent, or the like of the single battery 401 be detected. The detection of the overcharge or the like is performed for the respective single batteries 401 or all of the single batteries 401. Herein, when the overcharge or the like is detected in the respective single batteries 401, a battery voltage may be detected, or a positive electrode potential or a negative electrode potential may be detected. In the latter case, a lithium electrode used as a reference electrode is inserted into the respective single batteries 401. In the case of FIG. 6 and FIG. 7, wirings 415 for voltage detection are connected to the respective single batteries 401 and detection signals are transmitted to the protective circuit 406 via the wirings 415.

As illustrated in FIG. 6, the protective sheets 416 formed of rubber or resin are disposed on three side surfaces of the assembled batteries 403 excluding the side surface from which the positive electrode terminals 207 and the negative electrode terminals 206 protrude.

The assembled batteries 403 are stored together with the respective protective sheets 416 and the printed wiring board 404 in the storing container 417. That is, the protective sheets 416 are disposed on both of the inner surfaces of the storing container 417 in the longer side direction and the inner surface in the shorter side direction, and the printed wiring board 404 is disposed on the inner surface opposite to the protective sheet 416 in the shorter side direction. The assembled batteries 403 are located in a space surrounded by the protective sheets 416 and the printed wiring board 404. The cover 418 is mounted on the upper surface of the storing container 417.

When the assembled batteries 403 are fixed, a thermal shrinkage tape may be used instead of the adhesive tape 402. In this case, protective sheets are disposed on both side surfaces of the assembled batteries, the thermal shrinkage tape is circled, and then the thermal shrinkage tape is subjected to thermal shrinkage, so that the assembled batteries are fastened.

Here, in FIG. 6 and FIG. 7, the single batteries 401 connected in series are illustrated. However, to increase a battery capacity, the single batteries 401 may be connected in parallel or may be connected in a combination form of series connection and parallel connection. The assembled battery packs can also be connected in series or in parallel.

According to the aforementioned present embodiment, it is possible to provide the nonaqueous electrolyte secondary battery pack. The nonaqueous electrolyte secondary battery pack according to the present embodiment includes at least one of the aforementioned nonaqueous electrolyte secondary battery according to the third embodiment.

This kind of nonaqueous electrolyte secondary battery pack is excellent in charge and discharge cycle.

Herein, the form of the nonaqueous electrolyte secondary battery pack can be appropriately modified according to a use application. A use application of the nonaqueous electrolyte secondary battery pack according to the embodiment is preferably one which is required to show excellent cycle characteristics when a large current is extracted. Specifically, the battery pack can be used for power of digital cameras, a two-wheeled or four-wheeled hybrid electric vehicle, a two-wheeled or four-wheeled electric vehicle, an assist bicycle, and the like. In particular, the nonaqueous electrolyte secondary battery pack using the nonaqueous electrolyte secondary batteries with excellent high temperature characteristics is appropriately used for vehicles.

EXAMPLES

Hereinafter, the aforementioned embodiments are described on the basis of the examples.

Example 1

(Production of Negative Electrode Material)

The pulverization of SiO, the kneading of SiO and the other materials, the formation of the composite product of SiO and the other materials, and the burning treatment for this composite product were carried out under the following conditions, to thereby obtain the negative electrode material.

SiO was pulverized as follows. The SiO powder of the raw material was pulverized for a predetermined time by the continuous bead mill apparatus using beads having the particle size of 0.5 µm and ethanol as a dispersion medium.

Furthermore, the SiO powder was pulverized for a predetermined time by the planetary ball mill using a ball having the particle size of 0.1 µm and ethanol as a dispersion medium, to thereby produce the SiO fine powder.

Subsequently, the burning was carried out by holding the obtained SiO fine powder for 3 hours at 1,100° C. under an argon gas atmosphere.

Then, the burned product was cooled to room temperature, and was disproportionated into the Si phase and the $SiO_x$ phase.

The obtained SiO fine powder 28 g having the Si phase and the $SiO_x$ phase, the graphite powder 5 g having a particle size of 3 µm which was an electroconductive carbonaceous material, and the resole resin 30 g which was an organic material were added in ethanol 50 g. This mixture was subjected to the kneading treatment using the kneader, and further ethanol 200 g was added thereto, to thereby produce the slurry.

The obtained slurry was granulated by the spray dryer in which the drying upper part temperature was set to 120° C. and the drying lower part temperature was set to 80° C. Then, the granulated product was put in the oven of 150° C., and the curing reaction was carried out for 2 hours, to thereby obtain the silicon/organic resin composition composite product particle (the negative electrode material).

The obtained silicon/organic resin composition composite product particle was subjected to the measurement of the particle size distribution, and it was found that the maximum particle size was 25 µm and the particle size d50 obtained when the cumulative volume percentage of the particle size distribution was 50% was 6 µm.

Also, the elemental analysis of the silicon/organic resin composition composite product particle was carried out by high-frequency heating/infrared absorption method (device name: EMIA-920V2 manufactured by HORIBA, Ltd.), to thereby quantify the carbon contained in the silicon/organic resin composition composite product particle. Also, the elemental analysis of the silicon/organic resin composition composite product particle was carried out by the inert gas fusion/thermal conductivity method (device name: RH402 manufactured by LECO Corporation), to thereby quantify the hydrogen contained in the silicon/organic resin composition composite product particle. From the results of the quantitative analyses of the carbon and hydrogen, the element ratio of the carbon and hydrogen contained in the silicon/organic resin composition composite product particle (carbon/hydrogen) was calculated. The results are shown in Table 1.

(Production of Electrochemical Measuring Cell)

The aforementioned negative electrode material 76.5 mass %, the graphite 15 mass % having the average primary particle size of 3 μm, styrene-butadiene rubber (SBR) resin 3.5 mass %, and carboxymethyl cellulose 5 mass % were kneaded by using NMP as a dispersion medium, to thereby prepare the negative electrode slurry.

Subsequently, the negative electrode slurry was applied with an interval of 80 μm onto the copper foil having the thickness of 12 μm, dried for 2 hours at 100° C., and rolled at the pressure of 2.0 kN. Then, the rolled negative electrode was cut into a predetermined size, and was further dried under vacuum for 12 hours at 100° C., to thereby obtain the test electrode.

The electrochemical measuring cell was produced under an argon atmosphere by using the aforementioned test electrode, the metal lithium foil as the counter electrode and the reference electrode, and the nonaqueous electrolyte. The 1 M solution, which was produced by dissolving $LiPF_6$ in the mixed solvent of ethylene carbonate (EC) and diethyl carbonate (DEC) (the volume ratio of EC:DEC=1:2), was used as the nonaqueous electrolyte.

(Electrochemical Measurement)

The charge and discharge test was carried out at room temperature under an argon atmosphere by using the aforementioned electrochemical measuring cell.

Regarding the conditions for the charge and discharge test, the charge was carried out at the current density of 1 $mA/cm^2$ until the electrical potential difference between the reference electrode and the test electrode became 0.01 V, the constant voltage charge was carried out for 16 hours at 0.01 V, and then the discharge was carried out at the current density of 1 $mA/cm^2$ to reach 1.5 V. The initial discharge capacity was measured by the charge and discharge test. The results are shown in Table 1.

Furthermore, the charge was carried out at the current density of 1 $mA/cm^2$ until the electrical potential difference between the reference electrode and the test electrode became 0.01 V, and then the discharge was carried out at the current density of 1 $mA/cm^2$ to reach 1.5 V. This cycle was repeated 100 times, and the holding ratio of the discharge capacity at the 100th cycle to the discharge capacity at the 1st cycle was measured. The results are shown in Table 1.

Example 2

The silicon/organic resin composition composite product particle (the negative electrode material) was obtained in the same manner as Example 1 except for using the carbon fiber 1 g having the average diameter of 15 nm and the average length of 5 μm as the conductive carbonaceous material, The obtained silicon/organic resin composition composite product particle was subjected to the measurement of the particle size distribution, and it was found that the maximum particle size was 28 μm and the particle size d50 obtained when the cumulative volume percentage of the particle size distribution was 50% was 8.5 μm.

The obtained silicon/organic resin composition composite product particle was subjected to the measurements in the same manner as Example 1 such that the carbon and hydrogen contained in the silicon/organic resin composition composite product particle (carbon/hydrogen) were quantified. Then, the element ratio of the carbon and hydrogen contained in the silicon/organic resin composition composite product particle (carbon/hydrogen) was calculated. The results are shown in Table 1.

Also, the obtained negative electrode material was used to obtain the test electrode in the same manner as Example 1.

Furthermore, the obtained test electrode was used to obtain the electrochemical measuring cell in the same manner as Example 1.

The obtained electrochemical measuring cell was subjected to the electrochemical measurement in the same manner as Example 1. The results are shown in Table 1.

Example 3

The negative electrode material 77 mass % obtained in Example 2, the graphite 15 mass % having the average primary particle size of 3 μm, and the polyimide resin 8 mass % were kneaded by using NMP as a dispersion medium, to thereby prepare the negative electrode slurry.

Subsequently, the negative electrode slurry was applied with an interval of 80 μm onto the copper foil having the thickness of 12 μm, and rolled at the pressure of 2.0 kN. Then, the rolled negative electrode was subjected to the thermal treatment under an argon atmosphere at 250° C. for 2 hours. Then, the thermally treated negative electrode was cut into a predetermined size, and was further dried under vacuum for 12 hours at 100° C., to thereby obtain the test electrode.

The obtained test electrode was used to produce the electrochemical measuring cell in the same manner as Example 1.

The electrochemical measurement was carried out for the obtained electrochemical measuring cell in the same manner as Example 1. The results are shown in Table 1.

Example 4

The silicon fine particle 28 g having the average primary particle size of 80 nm, the graphite powder 5 g having the particle size of 3 μm which was an electroconductive carbonaceous material, and the resole resin 30 g which was an organic material were added in ethanol 50 g. This mixture was subjected to the kneading treatment using the kneader, and further ethanol 200 g was added thereto, to thereby produce the slurry.

The obtained slurry was granulated by the spray dryer in which the drying upper part temperature was set to 120° C. and the drying lower part temperature was set to 80° C. Then, the granulated product was put in the oven of 150° C., and the curing reaction was carried out for 2 hours, to thereby obtain the silicon/organic resin composition composite product particle (the negative electrode material).

The obtained silicon/organic resin composition composite product particle was subjected to the measurement of the particle size distribution, and it was found that the maximum particle size was 25 μm and the particle size d50 obtained when the cumulative volume percentage of the particle size distribution was 50% was 8.1 μm.

The obtained silicon/organic resin composition composite product particle was subjected to the measurements in the same manner as Example 1 such that the carbon and hydrogen contained in the silicon/organic resin composition composite product particle (carbon/hydrogen) were quantified. Then, the element ratio of the carbon and hydrogen contained in the silicon/organic resin composition composite product particle (carbon/hydrogen) was calculated. The results are shown in Table 1.

The negative electrode material 77 mass % obtained in the aforementioned manner, the graphite 15 mass % having the average primary particle size of 3 µm, and the polyimide resin 8 mass % were kneaded by using NMP as a dispersion medium, to thereby prepare the negative electrode slurry.

Subsequently, the negative electrode slurry was applied with an interval of 80 µm onto the copper foil having the thickness of 12 µm, and rolled at the pressure of 2.0 kN. Then, the rolled negative electrode was subjected to the thermal treatment under an argon atmosphere at 250° C. for 2 hours. Then, the thermally treated negative electrode was cut into a predetermined size, and was further dried under vacuum for 12 hours at 100° C., to thereby obtain the test electrode.

The obtained test electrode was used to produce the electrochemical measuring cell in the same manner as Example 1.

The obtained electrochemical measuring cell was subjected to the electrochemical measurement in the same manner as Example 1. The results are shown in Table 1.

Example 5

The silicon/organic resin composition composite product particle (the negative electrode material) was obtained in the same manner as Example 1 except for using the carbon fiber 1 g having the average diameter of 15 nm and the average length of 5 µm as the conductive carbonaceous material.

The obtained silicon/organic resin composition composite product particle was subjected to the measurement of the particle size distribution, and it was found that the maximum particle size was 30 µm and the particle size d50 obtained when the cumulative volume percentage of the particle size distribution was 50% was 8 µm.

The obtained silicon/organic resin composition composite product particle was subjected to the measurements in the same manner as Example 1 such that the carbon and hydrogen contained in the silicon/organic resin composition composite product particle (carbon/hydrogen) were quantified. Then, the element ratio of the carbon and hydrogen contained in the silicon/organic resin composition composite product particle (carbon/hydrogen) was calculated. The results are shown in Table 1.

Also, the obtained negative electrode material was used to obtain the test electrode in the same manner as Example 1.

Furthermore, the obtained test electrode was used to obtain the electrochemical measuring cell in the same manner as Example 1.

The obtained electrochemical measuring cell was subjected to the electrochemical measurement in the same manner as Example 1. The results are shown in Table 1.

Example 6

The tin (Sn) fine particle 28 g having the average particle size of 80 nm, the carbon fiber 1 g having the average diameter of 15 nm and the average length of 5 µm which was an electroconductive carbonaceous material, and the resole resin 30 g which was an organic material were added in ethanol 50 g. This mixture was subjected to the kneading treatment using the kneader, and further ethanol 200 g was added thereto, to thereby produce the slurry.

The obtained slurry was granulated by the spray dryer in which the drying upper part temperature was set to 120° C. and the drying lower part temperature was set to 80° C. Then, the granulated product was put in the oven of 150° C., and the curing reaction was carried out for 2 hours, to thereby obtain the tin/organic resin composition composite particle (the negative electrode material).

The obtained tin/organic resin composition composite product particle was subjected to the measurement of the particle size distribution, and it was found that the maximum particle size was 25 µm and the particle size d50 obtained when the cumulative volume percentage of the particle size distribution was 50% was 8.4 µm.

The obtained tin/organic resin composition composite product particle was subjected to the measurements in the same manner as Example 1 such that the carbon and hydrogen contained in the tin/organic resin composition composite product particle (carbon/hydrogen) were quantified. Then, the element ratio of the carbon and hydrogen contained in the tin/organic resin composition composite product particle (carbon/hydrogen) was calculated. The results are shown in Table 1.

Also, the obtained negative electrode material was used to obtain the test electrode in the same manner as Example 1.

Furthermore, the obtained test electrode was used to obtain the electrochemical measuring cell in the same manner as Example 1.

The obtained electrochemical measuring cell was subjected to the electrochemical measurement in the same manner as Example 1. The results are shown in Table 1.

Example 7

The aluminum (Al) fine particle 28 g having the average particle size of 300 nm, the carbon fiber 1 g having the average diameter of 15 nm and the average length of 5 µm which was an electroconductive carbonaceous material, and the resole resin 30 g which was an organic material were added in ethanol 50 g. This mixture was subjected to the kneading treatment using the kneader, and further ethanol 200 g was added thereto, to thereby produce the slurry.

The obtained slurry was granulated by the spray dryer in which the drying upper part temperature was set to 120° C. and the drying lower part temperature was set to 80° C. Then, the granulated product was put in the oven of 150° C., and the curing reaction was carried out for 2 hours, to thereby obtain the aluminum/organic resin composition composite product particle (the negative electrode material).

The obtained aluminum/organic resin composition composite product particle was subjected to the measurement of the particle size distribution, and it was found that the maximum particle size was 31 µm and the particle size d50 obtained when the cumulative volume percentage of the particle size distribution was 50% was 12.4 µm.

The obtained aluminum/organic resin composition composite product particle was subjected to the measurements in the same manner as Example 1 such that the carbon and hydrogen contained in the aluminum/organic resin composition composite product particle (carbon/hydrogen) were quantified. Then, the element ratio of the carbon and hydrogen contained in the aluminum/organic resin composition composite product particle (carbon/hydrogen) was calculated. The results are shown in Table 1.

Also, the obtained negative electrode material was used to obtain the test electrode in the same manner as Example 1.

Furthermore, the obtained test electrode was used to obtain the electrochemical measuring cell in the same manner as Example 1.

The obtained electrochemical measuring cell was subjected to the electrochemical measurement in the same manner as Example 1. The results are shown in Table 1.

Comparative Example 1

The SiO fine powder 2.8 g obtained in the same manner as Example 1, the graphite powder 0.7 g having the particle size of 3 μm, and the carbon fiber 0.06 g having the average diameter of 180 nm were added in the mixed solvent of furfuryl alcohol 4.0 g, ethanol 10 g and water 0.125 g. This mixture was subjected to the kneading treatment using the kneader, to thereby produce the slurry.

The dilute hydrochloric acid 0.2 g, which acted as the polymerization catalyst for furfuryl alcohol, was added to this slurry. Then, the slurry was allowed to stand at room temperature so as to be dried and solidified. Through this process, the carbon composite product was obtained.

The obtained carbon composite product was burned under an argon atmosphere for 3 hours at 1050° C., and then was cooled to room temperature. Then, the carbon composite product was pulverized and subjected to a sieve having the diameter of 20 μm, to thereby obtain the negative electrode material.

The obtained negative electrode material was subjected to the measurements in the same manner as Example 1 such that the carbon and hydrogen contained in the negative electrode material were quantified. Then, the element ratio of the carbon and hydrogen contained in the negative electrode material (carbon/hydrogen) was calculated. The results are shown in Table 1.

The aforementioned negative electrode material 76.5 mass %, the graphite 15 mass % having the average primary particle size of 3 μm, styrene-butadiene rubber (SBR) resin 3.5 mass %, and carboxymethyl cellulose 5 mass % were kneaded by using NMP as a dispersion medium, to thereby prepare the negative electrode slurry.

Subsequently, the negative electrode slurry was applied with an interval of 80 μm onto the copper foil having the thickness of 12 μm, dried for 2 hours at 100° C., and rolled at the pressure of 2.0 kN. Then, the rolled negative electrode was cut into a predetermined size, and was further dried under vacuum for 12 hours at 100° C., to thereby obtain the test electrode.

Also, the obtained test electrode was used to produce the electrochemical measuring cell in the same manner as Example 1.

The obtained electrochemical measuring cell was subjected to the electrochemical measurement in the same manner as Example 1. The results are shown in Table 1.

Comparative Example 2

The negative electrode material was obtained in the same manner as Comparative Example 1 except for using the silicon fine particle having the average primary particle size of about 80 nm instead of the SiO fine powder as the silicon source.

The obtained negative electrode material was subjected to the measurements in the same manner as Example 1 such that the carbon and hydrogen contained in the negative electrode material were quantified. Then, the element ratio (carbon/hydrogen) of the carbon and hydrogen contained in the negative electrode material was calculated. The results are shown in Table 1.

The negative electrode material 77 mass % obtained in the aforementioned manner, the graphite 15 mass % having the average primary particle size of 3 μm, and the polyimide resin 8 mass % were kneaded by using NMP as a dispersion medium, to thereby prepare the negative electrode slurry.

Subsequently, the negative electrode slurry was applied with an interval of 80 μm onto the copper foil having the thickness of 12 μm, and rolled at the pressure of 2.0 kN. Then, the rolled negative electrode was subjected to the thermal treatment under an argon atmosphere at 250° C. for 2 hours. Then, the thermally treated negative electrode was cut into a predetermined size, and was further dried under vacuum for 12 hours at 100° C., to thereby obtain the test electrode.

Also, the obtained test electrode was used to produce the electrochemical measuring cell in the same manner as Example 1.

The electrochemical measurement was carried out for the obtained electrochemical measuring cell in the same manner as Example 1. The results are shown in Table 1.

TABLE 1

| | Carbon/Hydrogen Ratio | Initial Discharge Capacity [mAh/g] | Holding Ratio of Discharge Capacity [mAh/g] |
| --- | --- | --- | --- |
| Example 1 | 0.35 | 805 | 94 |
| Example 2 | 0.24 | 798 | 96 |
| Example 3 | 0.24 | 821 | 98 |
| Example 4 | 0.20 | 1681 | 91 |
| Example 5 | 0.20 | 1755 | 95 |
| Example 6 | 0.35 | 435 | 96 |
| Example 7 | 0.33 | 586 | 91 |
| Comparative Example 1 | 1.41 | 621 | 78 |
| Comparative Example 2 | 1.33 | 1152 | 64 |

From the results of Table 1, it was confirmed that the test electrodes (negative electrodes) of Examples 1-7 had the good cycle characteristics.

By contrast, it was confirmed that the test electrodes (negative electrodes) of Comparative Examples 1-2 had the poor cycle characteristics because the electroconductive path was blocked by a defect such as the destruction of the organic material component as the charge and discharge proceed.

While certain embodiments have been described, these embodiments have been presented by way of example only, and are note intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:
1. A nonaqueous electrolyte secondary battery, comprising: a positive electrode; a negative electrode comprising a current collector, and an electrode mixture layer that is formed on the current collector and comprises a negative electrode material, a carbonaceous material, and a binder; and a nonaqueous electrolyte) wherein the negative elec- trode material consists of granular composite product that comprises: an organic resin composition; a metal dispersed in the organic resin composition or a metal and an oxide of the metal dispersed in the organic resin composition; and an electroconductive carbonaceous material, wherein an elemental ratio A/B (mass/mass) of carbon (A) and hydrogen (B) is 1 or lower; wherein the electroconductive carbonaceous material include at least one selected from the group consisting of graphite, hard carbon, soft carbon, amorphous carbon and acetylene black.

2. A battery pack comprising one or more of the nonaqueous electrolyte secondary battery according to claim 1.

3. The nonaqueous electrolyte secondary battery according to claim 1, wherein the metal of the negative electrode material comprises at least one selected from e group consisting of Si, Sn, Al, In, Ga, Ph, Ti, Ni, Mg, W, Mo, and Fe.

4. The nonaqueous electrolyte secondary battery according to claim 1, wherein the composite product is formed of a composite product particle and the electroconductive carbonaceous material,
wherein the composite product particle is formed of the organic resin composition comprising microcrystalline silicon or the organic resin composition having a silicon oxide phase and a silicon phase, and
wherein the silicon phase is formed of a crystalline silicon that is dispersed in the silicon oxide phase and is complexed with the silicon oxide phase.

5. The nonaqueous electrolyte secondary battery according to claim 1, wherein the electroconductive carbonaceous material is a fibrous carbon having an aspect ratio is 10 or higher, and
wherein the content of the electroconductive carbonaceous material is within a range of 0.001 mass % to 10 as % with respect to 100 mass % of the organic resin composition.

6. The nonaqueous electrolyte secondary battery according to claim 1, wherein the organic resin composition comprises a cured product of a resol resin.

7. The nonaqueous electrolyte secondary battery according to claim 4, wherein the composite product particle is formed of the organic resin composition having a silicon oxide phase and a silicon phase, and
wherein a ratio ($Si/SiO_2$) of the silicon phase to the silicon oxide phase is within a range of $0.3 < Si/SiO_2 < 1.5$.

8. The nonaqueous electrolyte secondary battery according to claim 4, wherein a value of (standard deviation/average size) is 1.0 or less, when 16% cumulative diameter in volume fraction is represented by d16%, 84% cumulative diameter is represented by d84%, and the value represented by (d84%−d16%)/2 is defined as the standard deviation.

9. The nonaqueous electrolyte secondary battery according to claim 7, wherein a half-value width of the diffraction peak of the Si (220) plane in a powder X-ray diffraction measurement of the negative electrode material is 1.5° more and 8.00 or less.

* * * * *